No. 712,060. Patented Oct. 28, 1902.
R. HACKING.
OVERHEAD ELECTRIC CONDUCTOR, OVERHEAD TELEPHONE, TELEGRAPH, OR LIKE WIRE.
(Application filed Feb. 26, 1901.)

(No Model.) 3 Sheets—Sheet 1.

Witnesses
H. K. Boulter

Inventor
Robert Hacking
By Wm. E. Boulter
Attorney

THE NORRIS PETERS CO., PHOTO-LITHO., WASHINGTON, D. C.

No. 712,060. Patented Oct. 28, 1902.
R. HACKING.
OVERHEAD ELECTRIC CONDUCTOR, OVERHEAD TELEPHONE, TELEGRAPH, OR LIKE WIRE.
(Application filed Feb. 26, 1901.)
(No Model.) 3 Sheets—Sheet 2.
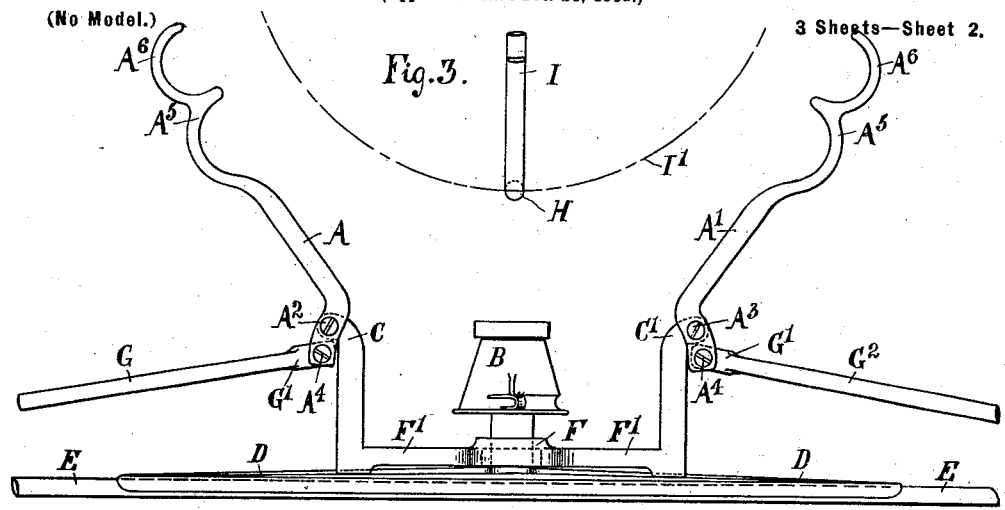
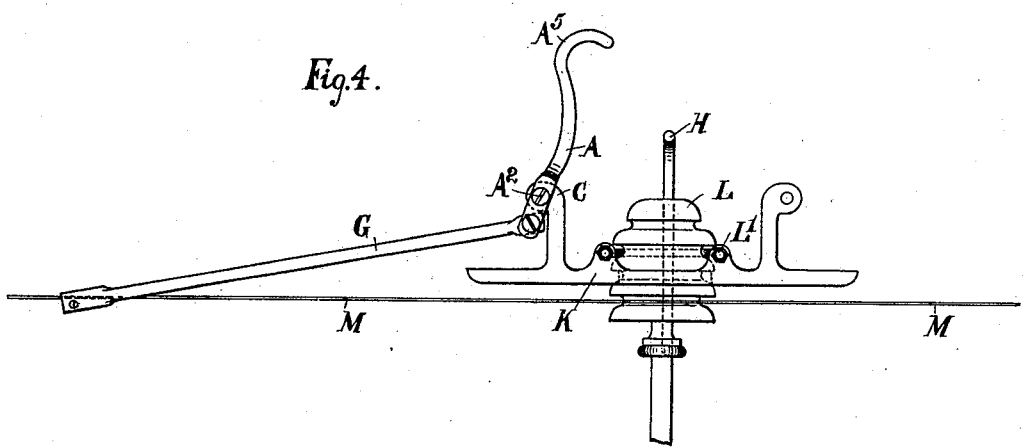
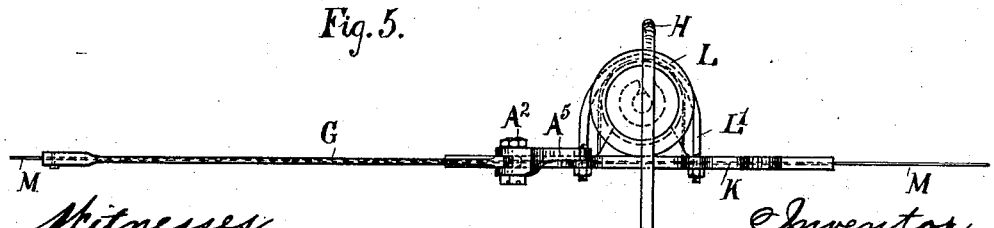
Witnesses
Inventor
Robert Hacking
By Wm E Poulter
Attorney.

No. 712,060. Patented Oct. 28, 1902.
R. HACKING.
OVERHEAD ELECTRIC CONDUCTOR, OVERHEAD TELEPHONE, TELEGRAPH, OR LIKE WIRE.
(Application filed Feb. 26, 1901.)
(No Model.) 3 Sheets—Sheet 3.
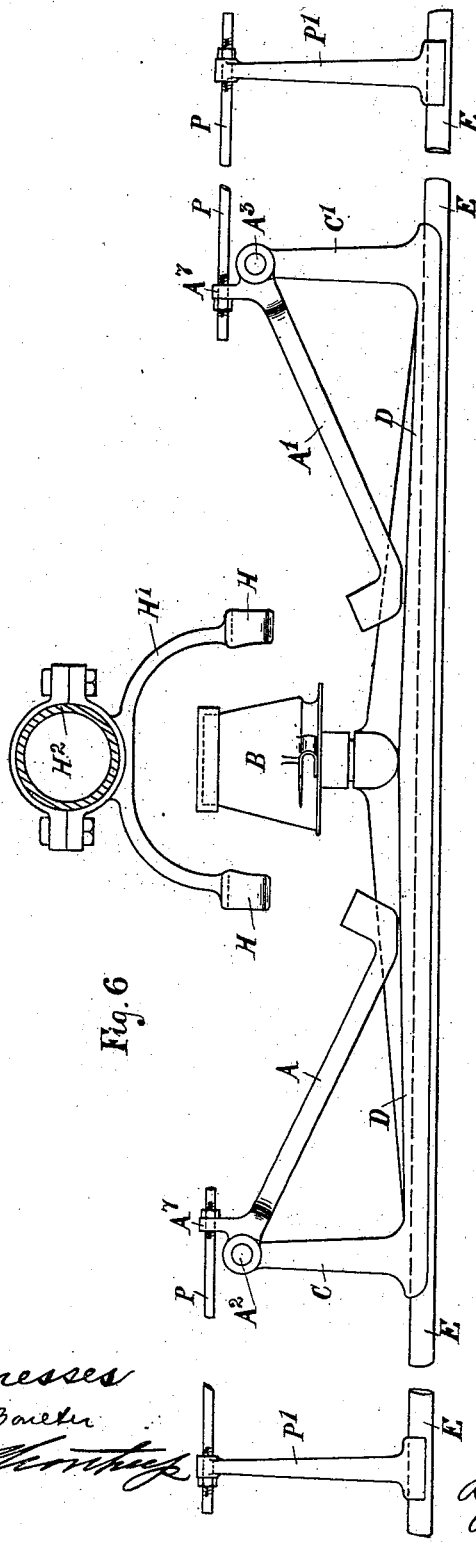
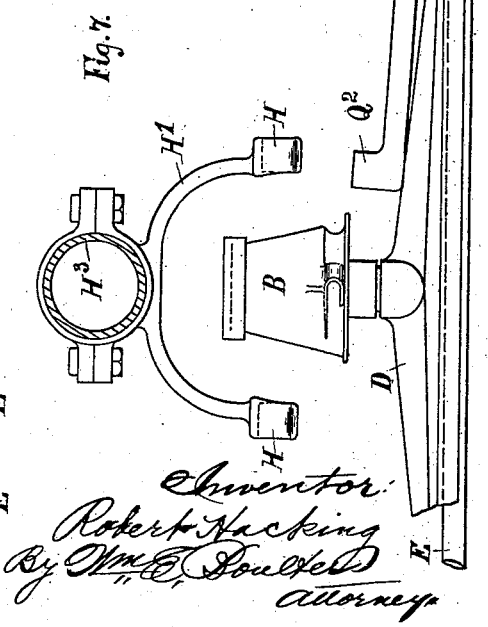

UNITED STATES PATENT OFFICE.

ROBERT HACKING, OF WEST BRIDGEFORD, ENGLAND.

OVERHEAD ELECTRIC CONDUCTOR, OVERHEAD TELEPHONE, TELEGRAPH, OR LIKE WIRE.

SPECIFICATION forming part of Letters Patent No. 712,060, dated October 28, 1902.

Application filed February 26, 1901. Serial No. 48,960. (No model.)

*To all whom it may concern:*

Be it known that I, ROBERT HACKING, a subject of the King of England, and a resident of 5 Woodland road, West Bridgeford, in the county of Nottingham, England, have invented certain new and useful Improvements in or Relating to Overhead Electric Conductors, Overhead Telephone, Telegraph, or Like Wires, (for which application has been made in Great Britain under No. 13,515, dated July 27, 1900,) of which the following is a specification.

This invention relates to improved automatic safety mechanism applicable to overhead trolley wires or conductors for electric traction, overhead electric cables or the like, overhead telephone or telegraph wires which cross over electric conductors, or to the guard-wires themselves for the purpose of rendering such wires electrically harmless to the public if they should break and fall to the ground.

The present invention may be used in connection with either short or continuous lengths of wires. It may also be applied to insulated conductor-supports of the usual form, whether the said supports are carried on suspensory wires or on poles or other fixed supports.

The invention will be best understood by reference to the accompanying drawings, in which—

Figure 1:
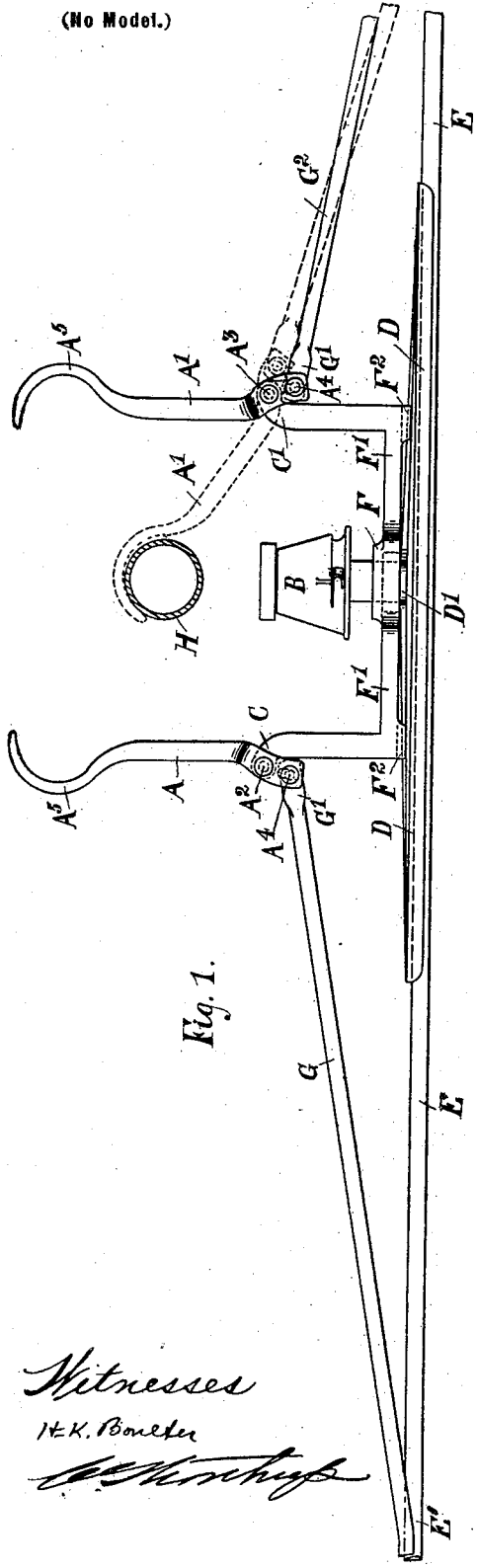
Figure 2:
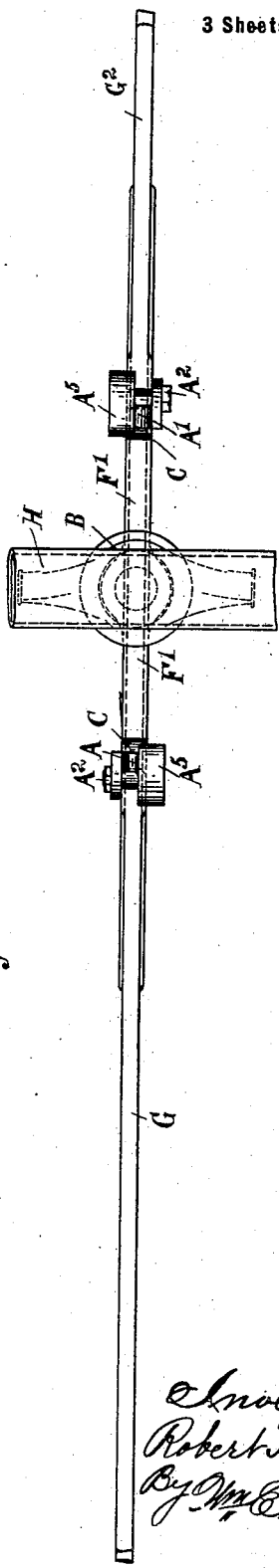

Figure 1 is an elevation, and Fig. 2 a plan, showing my invention as applied to a trolley wire or conductor supported by an arm on a pole. Fig. 3 is an elevation showing my invention as applied to a trolley wire or conductor supported on a suspensory wire. Fig. 4 is an elevation, and Fig. 5 a plan, showing my invention applied to a telegraph, telephone, or like wire. Figs. 6 and 7 are elevations showing modifications in the arrangement of the several parts of the apparatus.

Like letters indicate like parts throughout the drawings.

According to my invention I employ two levers A A' in connection with each support where it is requisite, (see Figs. 1 and 2,) one lever, A, being placed on one side of the insulator-cap B of said support and the other, A', on the opposite side, as shown. These two levers A A' are pivoted at $A^2$ $A^3$ on lugs C C', respectively, said lugs being either formed on the ear D, to which the trolley wire or conductor E is attached, or, as shown, on a bracket, which is secured on the said ear, the levers A A' being thus electrically connected to the conductor E. This bracket (see Fig. 1) is comprised of a boss F, which fits partly on the pin for attaching the ear D to the cap B and partly on the boss D' of the ear, and extensions F' of said boss having seatings $F^2$, which take a bearing on the upper face of the ear D. The bracket F is thus secured on the ear D by the same means as the latter is attached to the insulator-cap B and practically forms a part of the ear D. The lugs C C' are formed on the extensions $F^2$ or vertical continuations thereof. The lower and shorter end of the lever A is connected by a connecting-link G to a point E' on the trolley-wire or electric conductor E, which point may be any suitable distance away from the end of the ear D. The inner end C' of this link G is preferably hinged or pivoted at $A^4$ to the lower end of the lever A, while its outer end may be in like manner connected to a lug secured to the conductor E or rigidly connected thereto, as shown. The lower end of the lever A' is connected to the conductor E on the corresponding side of the support by a connecting-link $G^2$ in precisely the same manner as the lever A. When the conductor E breaks, say, on the right side of the support, its free ends will fall and its own weight will bend it down at the point E'. This action of the conductor causes the link $G^2$ to draw the lower short end of the lever A' outward and move its upper longer end inward into the portion shown in dotted lines in Fig. 1. The upper ends $A^5$ of both the levers A A' are adapted when moved into this position to engage with a fixed contact-piece or striking part H, which is electrically connected to the negative or return conductor, which in an electric traction system would be the rails. The result is that the conductor E is short-circuited with the negative or return conductor through the lever A' and the contact-piece H, thus causing the safety-fuse to be immediately blown out.

The contact-piece H referred to is preferably placed directly above the cap B of the support and between the upper ends $A^5$ of the levers A A', so that the one contact-piece will serve for both levers, and where the support is carried by a metallic arm, as shown in Figs. 1 and 2, this arm may be used as the contact-piece or striking part H, the upper ends $A^5$ of the levers A A' being adapted, as shown, to engage with or fall on it. The arm H is in this case electrically connected to the rails either through the intermediary of the metal pole or by means of a suitable conductor. If preferred, a contact-piece or contact-pieces may be secured on the arm H and be connected to the rails or the negative conductor by an independent wire or cable.

It will be noticed that the inner ends of the links G $G^2$ are situated directly under the lugs C C', on which the respective levers A A' are pivoted, so that the inner ends of these links cannot be accidentally raised or displaced and the levers A A' thrown into action if struck, for example, by the trolley wheel or pole, as they are locked so long as the conductor remains intact.

When the support is carried by a suspensory wire, special provision may be made to carry a switch-contact or striking part. In this case the switch-contact may be comprised of a dependent metal loop I, (see Fig. 3,) the upper ends of which are secured to a suspensory or guard wire placed above that for carrying the support, while its lower bend forms a contact-piece H. The upper ends $A^5$ of the levers A A' are in this case shaped as shown, and they are normally disposed so that the lower end of the loop I can swing clear, as shown by the dotted arc I', of the upper ends of the levers A A' and not make contact therewith. Each lever A A' is also provided with an additional hook or extension $A^6$ on its end, so that it will when operated engage with the loop I if the latter should be out of the perpendicular. The loop I may be electrically connected to the rails through the intermediary of the suspensory or guard wire.

In applying my invention to a telephone or telegraph wire it is only necessary to apply it in most cases on that side of the support on which the wire extends over an electric conductor instead of in duplicate, as previously described. The lever A (see Figs. 4 and 5) is in this case pivoted at $A^2$ to a lug or extension C, formed on the bracket K, which latter is secured to the insulator L by a strap L' passing around the insulator. The outer end of the connecting-link G, which is connected to the telephone or telegraph wire M, is where the wire or conductor M is of small gage preferably weighted in order to make it more certain and quicker in its action. The contact-piece or striking part H is in this case comprised of a bracket, the lower end of which is preferably secured to the pin of the insulator, and its upper end extends above it, as shown, so that the lever A will engage with it, as hereinbefore described. This contact-piece or striking part H is connected to the earth, to which any excess current which may be obtained from the trolley wire or conductor by falling across it is diverted.

In the arrangement shown in Fig. 6 the levers A A' are disposed and work in an approximately horizontal position. They are pivoted at $A^2$ $A^3$ to lugs C C', respectively, said lugs being formed on the ear D of the support. Each lever A A' is provided with a short vertical arm or member $A^7$, which is connected by a rod P, the length of which is adjustable, to an arm or bracket P', secured to the trolley wire or conductor at the requisite point. The contact-pieces H, two of which are required—that is, one for each lever—may be formed or carried by a bracket H', secured on the supporting-arm $H^2$ of the pole.

In the arrangement shown in Fig. 7 the levers are dispensed with and arms or levers Q, corresponding to the links G $G^2$ in the arrangement previously described, are employed. The outer ends Q' of these arms or levers (only one of which is shown) are rigidly connected to the trolley wire or conductor E, while their inner ends $Q^2$ are adapted to engage with the contact-pieces H. The latter are carried by a bracket H', as in the arrangement previously described. The inner ends $Q^2$ of the arms or levers Q are in this case raised into contact with the contact-pieces H by the action of the conductor bending down (when it breaks) between the ends of the ear D and the points of attachment of the outer ends Q' of the arms or levers Q to the conductor E.

What I claim as my invention, and desire to secure by Letters Patent, is—

1. In a system of overhead electric conductors, the combination of a conductor forming the lead, an ear to which the conductor is attached, a return-conductor, a contact-piece connected to the return, and a member on the side of the ear having its outer end rigidly connected to the lead at a point which is a distance from the end of the ear and forming a branch of the lead having a free inner end which is moved by the bending down of the lead into contact with the contact-piece, substantially as described.

2. In a system of overhead electric conductors, the combination of a conductor forming the lead, an ear to which the conductor is attached, members on each side of the ear having their outer ends rigidly secured to the conductor at points which are a distance from the respective ends of the ear and forming branches of the lead with free inner ends, a return-conductor, contact-pieces connected to the return situated above the inner free ends of the branch members, which are moved upward into contact with the said contact-pieces when the conductor is bent down, substantially as described.

3. In a system of electric conductors, the combination of a conductor forming the lead, an ear to which the conductor is attached, a return-conductor, a contact-piece connected to the return, a member on the side of the ear having its outer ends rigidly connected to the lead at a point which is a distance from the end of the ear and forming a branch of the lead having a free inner end, and a lever pivotally mounted on the ear articulated to and forming a connection between the free end of the member and the contact-piece when the lead is bent down, substantially as described.

4. In a system of overhead electric conductors, the combination of a conductor forming the lead, an ear to which the conductor is attached, a return-conductor, a contact-piece connected to the return, members on the sides of the ear having their outer ends rigidly connected to the lead at points which are a distance from the respective ends of the ear forming branches of the lead with free inner ends, and levers pivotally mounted on each side of the ear which are articulated to the corresponding branch members and provide a connection between the free ends of said members and a common contact-piece, substantially as described.

5. In a system of overhead electric conductors, the combination of a conductor forming the lead, an ear to which the conductor is attached, a return-conductor, a contact-piece connected to the return, members on the sides of the ear having their outer ends rigidly connected to the lead at points which are a distance from the respective ends of the ear forming branches of the lead with free inner ends, and levers pivotally mounted on the ear at points above the free inner ends of the branch members and having their lower ends articulated to the said members and their upper ends carried upon each side of the contact-piece so as to provide a connection between said contact-piece and branch members when the lead is bent down substantially as described.

In testimony whereof I have signed my name to this specification in the presence of two subscribing witnesses.

ROBERT HACKING.

Witnesses:
J. JAMSON,
MARK SHAW.